(12) United States Patent
Godlewski et al.

(10) Patent No.: US 6,508,975 B1
(45) Date of Patent: Jan. 21, 2003

(54) AUTOMATED INTERNAL PIPE CUTTING DEVICE

(75) Inventors: William J. Godlewski, Clifton Park, NY (US); Gary S. Haffke, Ballston Spa, NY (US); Dale Purvis, Amsterdam, NY (US); Ronald W. Bashar, Oakdale, CT (US); Stewart D. Jones, Mechanicville, NY (US); Henry Moretti, Jr., Cranston, RI (US); James Pimentel, Warwick, RI (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 0 days.

(21) Appl. No.: 09/657,002

(22) Filed: Sep. 7, 2000

(Under 37 CFR 1.47)

(51) Int. Cl.[7] .................................................. B23K 7/00
(52) U.S. Cl. ............................ 266/55; 266/48; 148/196
(58) Field of Search ............................ 266/48, 54, 55; 148/194; 30/103

(56) References Cited

U.S. PATENT DOCUMENTS

| 3,711,076 A | | 1/1973 | Goetz ..................... 266/23 NN |
| 3,859,877 A | | 1/1975 | Sherer et al. .................. 82/82 |
| 3,883,950 A | | 5/1975 | Kurtz .......................... 30/106 |
| 3,977,076 A | * | 8/1976 | Vieira et al. .................. 30/103 |
| 4,179,101 A | | 12/1979 | Brautigäm ................... 266/77 |
| 4,424,629 A | | 1/1984 | Schott ......................... 30/105 |
| 4,455,015 A | | 6/1984 | Larikka ....................... 266/54 |
| 4,524,511 A | | 6/1985 | Montiero ..................... 30/108 |
| 4,844,660 A | | 7/1989 | Ortemond .................... 405/224 |
| 4,986,314 A | | 1/1991 | Hummler ..................... 138/97 |
| 5,006,687 A | | 4/1991 | Fujita et al. ........... 219/121.59 |
| 5,368,423 A | | 11/1994 | Hanna ........................ 409/132 |
| 5,499,453 A | | 3/1996 | Brauchitsch ................. 30/105 |
| 5,515,886 A | | 5/1996 | Granella ..................... 138/98 |
| 5,685,078 A | | 11/1997 | Obst et al. .................... 30/17 |
| 5,815,926 A | | 10/1998 | Ekern ......................... 30/103 |

* cited by examiner

Primary Examiner—Scott Kastler
(74) Attorney, Agent, or Firm—Virginia B. Caress; Paul A. Gottlieb

(57) ABSTRACT

The invention is a remotely controlled internal pipe cutting device primarily used for cutting pipes where the outside of the pipe is inaccessible at the line where the cut is to be made. The device includes an axial ram within a rotational cylinder which is enclosed in a housing. The housing is adapted for attachment to an open end of the pipe and for supporting the ram and cylinder in cantilever fashion within the pipe. A radially movable cutter, preferably a plasma arc torch, is attached to the distal end of the ram. A drive mechanism, containing motors and mechanical hardware for operating the ram and cylinder, is attached to the proximal end of the housing. The ram and cylinder provide for moving the cutter axially and circumferentially, and a cable assembly attached to a remote motor provide for the movement of the cutter radially, within the pipe. The control system can be adjusted and operated remotely to control the position and movement of the cutter to obtain the desired cut. The control system can also provide automatic standoff control for a plasma arc torch.

18 Claims, 4 Drawing Sheets

AUTOMATED INTERNAL PIPE CUTTING DEVICE

ACKNOWLEDGMENT OF FEDERAL RESEARCH SUPPORT

This invention was made or conceived in the course of or under a contract with the U.S. Department of Energy.

BACKGROUND OF THE INVENTION

This invention relates generally to the field of a metallurgical apparatus and particularly to remotely controlled devices and methods for cutting a pipe from within. More particularly, the invention relates to the manner in which a cutting device is mounted in the pipe and deployed to the point where the cut will be made.

The invention originated in the field of nuclear reactor dismantlement operations where physical access limitations necessitated that certain pipe cuts be made from inside the pipe at some distance from the end of the pipe and be made under remote control.

The inventive device was conceived to allow thick-walled reactor vessel main coolant loop piping to be reliably severed from the reactor vessel where conditions prevented access to the outside of the pipe. It was necessary to sever a pipe from the reactor vessel approximately at the juncture of the reactor vessel and the pipe. Access to the outside of the pipe was only available several feet from the desired cut line at the vessel-pipe juncture. It was also necessary to utilize a cutting process which could reliably sever a pipe up to about 4.5 inches in wall thickness. No existing system or equipment could be found which performed this task.

Development of the device required several plasma arc torch (PAC) process adaptations. It was also necessary to devise ways for routing PAC services to the torch while providing necessary control features compatible with the geometry of the piping, the rotating and translating motions of the device, and the available space within the pipe. In addition, the device needed to be capable of surviving the high temperature environment of the PAC process, including the molten by-product (dross) from the cutting.

Although numerous forms of pipe cutting devices exist in the art, some examples of which are listed below, none has been found which performs the required function of cutting large pipes at inaccessible locations under remote control.

U.S. Pat. No. 3,711,076 to Goetz (1973) discloses the use of an oxyacetylene torch attached to the distal end of a radial arm rotatably mounted on a frame within a large pipe. The frame comprises expandable radial arms for locating the frame within the pipe and a drive mechanism for rotating the radial arm. No provision is made for remotely controlling the location of the torch.

U.S. Pat. No. 4,455,015 to Larikka (1984) discloses a steering apparatus for an autogenous cutting torch for cutting holes of desired shape in flat or curved sheet walls. The apparatus provides for guiding a cutting torch along a preset path with a reciprocating or oscillating motion provided by cams or cranks. No provisions are made for severing pipes or remotely controlling the location of the torch.

U.S. Pat. No. 4,524,511 to Montiero (1985) discloses the use of cutting blades attached to pivoting arms mounted on a rotating axial drive shaft within the pipe. The shaft is supported by a centering device located at the open end of the pipe and driven by an external power source. No provisions are made for remotely controlling the location of the cutters.

U.S. Pat. No. 4,986,314 to Himmler (1991) discloses the use of a wheel-mounted carriage for traveling within a pipe. The carriage comprises a working head mounted on one face of the carriage and rotatable around a longitudinal axis of the carriage. The head can be used to mount various cutting and machining tools. The carriage and its tools are driven by hydraulic motors and its operation can be monitored by an on-board TV camera. This device is designed for use primarily in repairing pipelines and is substantially more complex and expensive than required for the present application.

U.S. Pat. No. 5,006,687 to Fujita, et al. (1985) discloses methods for cutting steel pipe pilings from within using either a non-contact process such as a plasma arc torch or a contact process such as a cutting grinder, or both. One method includes the use of a drive mechanism suspended by ropes from the top of a vertical pipe. The drive mechanism is centered within the pipe by expandable arms is after arriving at the desired vertical position. The cutter is rotated circumferentially inside the pipe by the drive mechanism. In another method, the cutter is suspended on a rod hanging in pendulum fashion from a pivot in a disk on the upper end of a vertical pipe. The cutter in this case is rotated from the upper end of the rod and located radially by tilting means at the top, or guides at the bottom, of the rod. The methods do not provide for three-axis location control of the cutter while in operation.

U.S. Pat. No. 5,368,423 to Hanna (1994) discloses a skid-mounted robotic cutter for re-establishing lateral connections in a lined sewer pipe. The cutter comprises a motor driven cutting tool oriented for cutting through the inserted lining of a main pipe where the lining covers the opening into a lateral pipe at its junction with the main pipe. The robotic cutter does not provide for severing the main pipe in which it is located.

U.S. Pat. No. 5,685,078 to Obst and Gray (1997) discloses a device comprising an annular cutter head driven by shaft from the open end of the pipe. The cutter head comprises a plurality of cutter wheels located in radial slots around the periphery of the head. As the cutter head is driven by the shaft, the cutter wheels are expanded radially by a conical member located axially within the annular cutter head. No provision is made for remote control of the cutter while in operation.

U.S. Pat. No. 5,815,926 to Ekern (1998) discloses a hand held device comprising a shaft having an upper end adapted for connection to a rotational power tool and a lower end to which a rotary cutting blade can be attached. A sleeve surrounding the shaft encloses a collar which can be clamped to the shaft to locate the sleeve axially on the shaft while permitting the shaft to rotate freely within the sleeve. The sleeve has a disk located on its end adjacent to the cutting blade. In operation, the cutting blade can be inserted into the open end of a pipe to a distance determined by the location of the disk and the pipe cut by manually moving the rotating cutter blade around the internal periphery of the pipe. This device provides a very simple illustration of internal pipe cutting at an externally inaccessible location; of course, it does not have the required capability of cutting large pipes or of remotely controlled operation.

None of these prior art devices performs the required function of cutting large pipes at inaccessible locations under remote control.

SUMMARY OF THE INVENTION

The invention is a remotely controlled internal pipe cutting device primarily used for cutting pipes in any orientation (i.e., the pipe is horizontal, vertical or inclined), where the outside of the pipe is inaccessible at the line where the cut is to be made. The device is useful where the pipe has a straight section extending to an accessible open end located a distance of up to several pipe diameters from the desired cut line. The device comprises an axial ram within a rotational cylinder which is enclosed in a housing attached at a proximal end to a support bracket. A radially movable cutter, preferably a plasma arc cutting (PAC) torch, is attached to the distal end of the ram. A drive mechanism, containing motors and mechanical hardware for operating the ram and cylinder, is attached to the proximal end of the housing. To use the device, the distal ends of the ram, cylinder and housing are inserted into the open end of the pipe and the support bracket is attached to the end of the pipe, thereby supporting the device in cantilever fashion within the pipe. In operation, the ram and cylinder provide for the movement of the cutter axially and circumferentially, and an arm and cable assembly attached to a remote motor provide for the movement of the cutter radially, within the pipe. The control system can adjust feed and rotation speeds manually and be operated remotely to control the position and movement of the cutter to obtain the desired cut.

A schematic which illustrates the device in its environment is shown in FIG. 1. A pipe 3 to be severed from a reactor vessel 4 extends from the vessel through a wall 5. The wall prevents access to the pipe at its juncture with the vessel. The pipe cutting device comprises an internal device 1 and an external device 2. The internal device 1 is attached to the accessible end of pipe 3 and cantilevered within the pipe. A PAC torch 11 is thereby located within the pipe and can be translated to the desired cut line and rotated to perform the cut. The external device 2 contains the drive mechanism, along with other external equipment, and provides the driving functions and services for the internal device 1.

The internal device is mounted onto the pipe end by a support bracket which supports the internal device within the pipe in a cantilever fashion. An axial ram provides translational (longitudinal to the pipe) motion for the torch assembly, which is mounted on the distal end of the ram. The translational motion of the ram is controlled by an electric motor and associated gear train ball screw assembly, and a motor controller. Rotation of the ram, which allows the torch to move around the inside periphery of the pipe, is provided by a rotation cylinder, associated gear train, and another motor and associated controller. The translational and rotational positions of the torch are determined by feedback from position encoders attached to the associated gear trains.

Radial motion of the torch assembly is controlled by a cable and reel assembly attached to a motor and controller which automatically adjusts the separation between the torch tip and the wall of the pipe to maintain the proper voltage across the arc when a PAC torch is used.

The device allows longitudinal cuts to be made to reach the circumferential cut area. This allows the piercing limitations of plasma arc cutting to be utilized in the thinner cut region.

The device preferably utilizes a commercially-available plasma arc cutting (PAC) process, with a specially designed plasma arc cutting torch, attached to an internal device which operates within the pipe and an external device which provides the drive mechanism and controls and services for operating the cutting device. This device can be used to reliably sever a pipe up to about 4.5 inches in wall thickness. This device permits a four-inch-thick pipe wall to be cut at a rate of 10 inches per minute.

The internal and external devices can be adapted for use with other cutting processes such as abrasive waterjet cutting. Use of the PAC or abrasive water jet processes allows cutting of pipes made of materials other than carbon steel, such as corrosion resistant steel (CRES) or CRES-clad.

Direct access to the reactor vessel piping is only available several feet from the desired cut line on the reactor vessel piping. Therefore, it is necessary to cut and remove a section of the pipe at this remote location and use the cut end of the pipe to mount the internal cutting device. The device is cantilever-mounted on the pipe end and extends through the pipe, toward the reactor vessel, to the desired cut location. An advantage of this is that it does not require contact with the inner surface of the pipe and therefore the process is not affected by surface irregularities such as weld reinforcement.

The invention effectively cuts using nitrogen and oxygen as the cover and cooling gasses in the PAC process without the use of potentially explosive hydrogen gas.

DETAILED DESCRIPTION OF THE INVENTION

Figure 1:
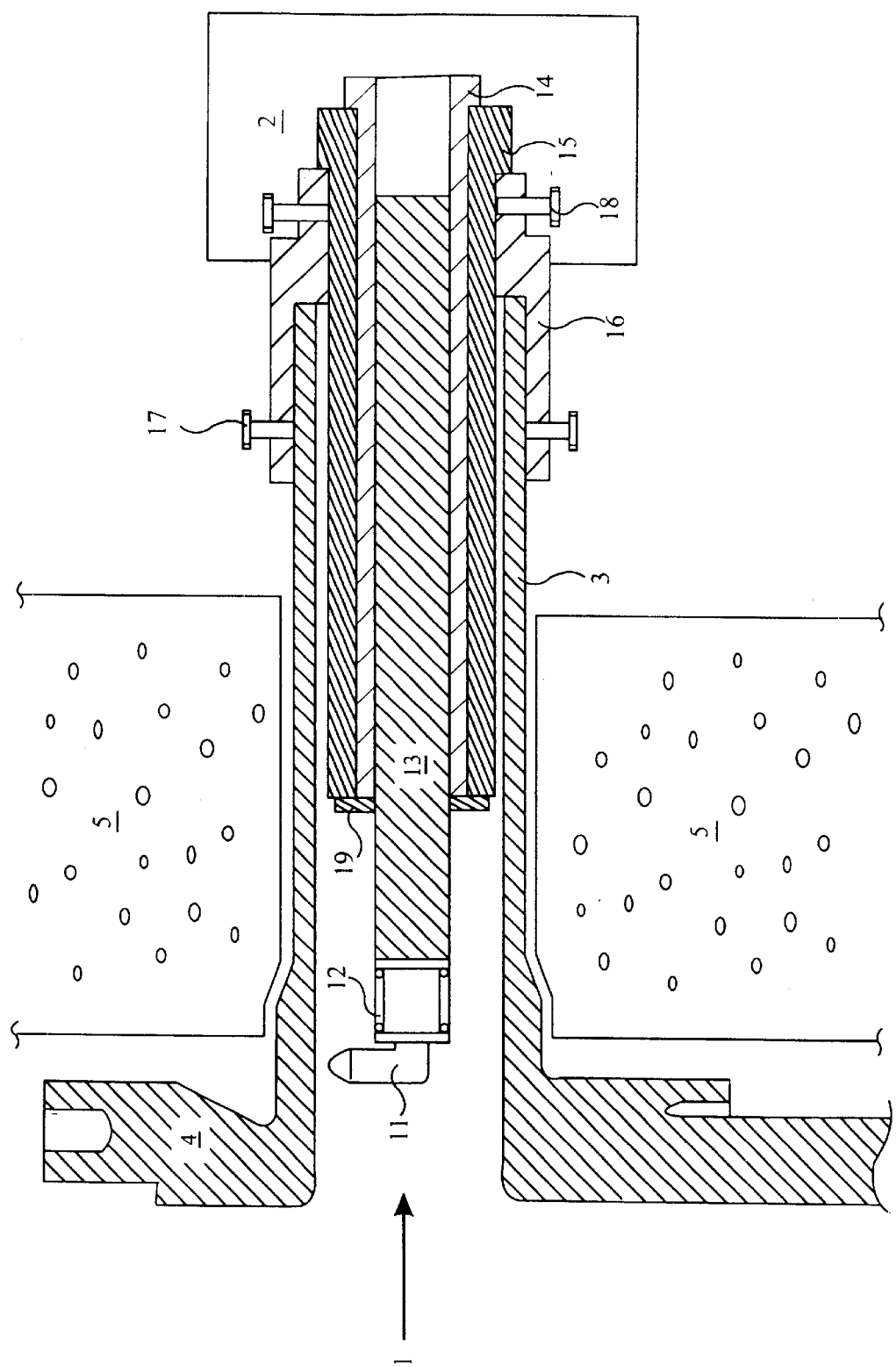
FIG. 1 is a schematic diagram of the device in its environment.

The pipe cutting device, comprising an internal device 1 and an external device 2, along with its environment is illustrated in FIG. 1. A pipe 3 to be severed from a reactor vessel 4 extends from the vessel through a wall 5. Internal device 1 comprises torch assembly 11, pivot arms 12, axial ram 13, rotation cylinder 14, housing 15 and support bracket 16. Internal device 1 also comprises bracket bolts 17 which secure support bracket 16 to pipe 3, housing bolts 18 which secure support bracket 16 to housing 15, and retainer plate 19 which prevents cylinder 14 from disengaging housing 15 during translation of ram 13. Bolts 18 also allow housing 15 to be rotated during initial set up of the device so that the starting point of torch 11 can be adjusted. External device 2 comprises the rotation and translation mechanisms comprising drive gears and screws, motors, encoders and motor controllers as well as a radial mechanism comprising a mechanical control cable, a cable reel, a reel motor and its associated motor controller.

Figure 2:
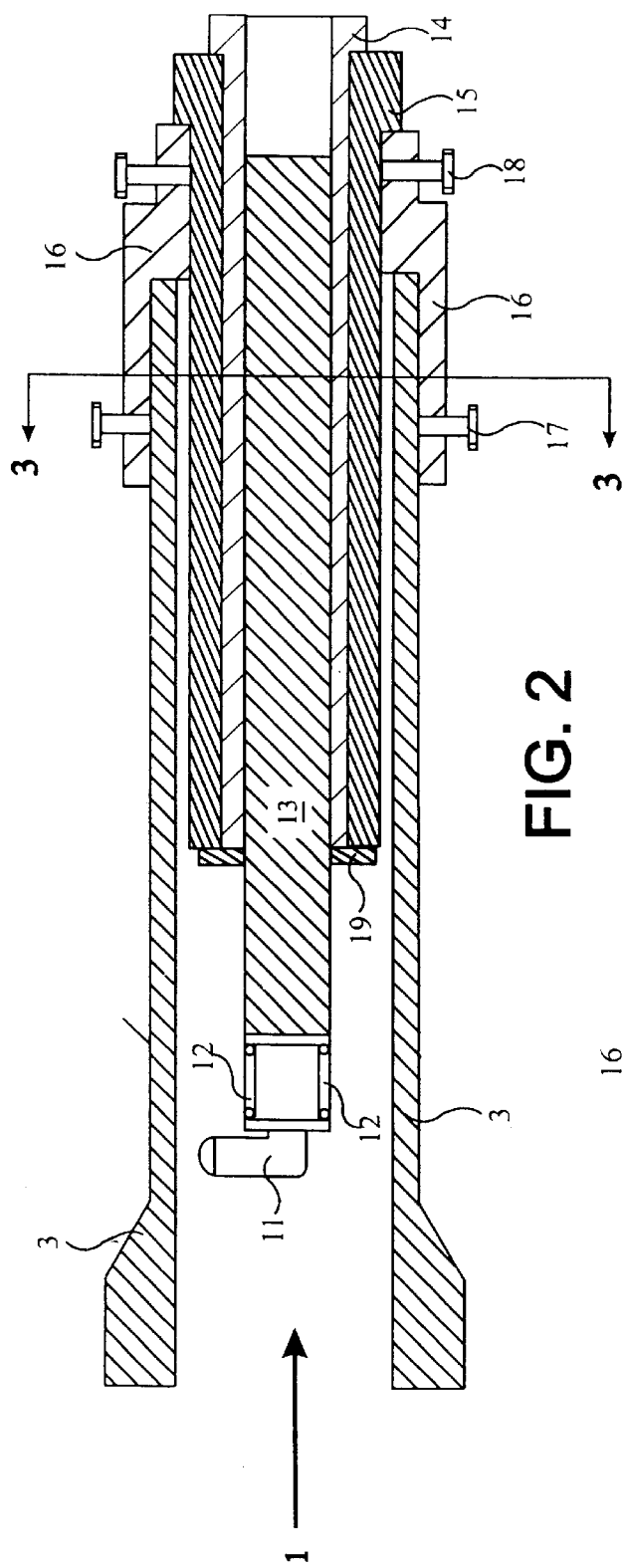
FIG. 2 is a drawing of the internal device and its support bracket.
Figure 3:
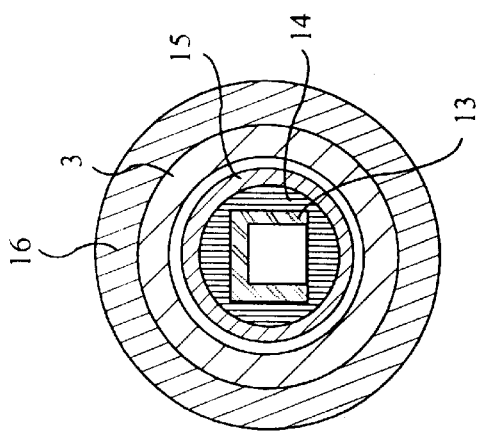
FIG. 3 is a cross sectional view from FIG. 2.

Referring to FIGS. 2 and 3, the internal device 1 is mounted onto a pipe end 3 by support bracket 16 which supports internal device 1 within the pipe 3 in a cantilever fashion. The internal device, mounted in cantilever-fashion, does not require contact with the inner surface of the pipe and the cutting process is therefore not affected by surface irregularities such as weld reinforcement. The axial ram 13 provides translational (longitudinal to the pipe) motion for the torch assembly 11, which is mounted on the distal end of the ram 13 by pivot arms 12. The torch assembly comprises commercially available plasma arc torch components which were specially designed and manufactured for the invention and assembled in a special small, right-angled package. The translational motion of the ram is controlled by an electric motor and associated gear train/ball screw assembly, and a motor controller. Rotation of the ram, which allows the torch to move around within the periphery of the pipe, is provided by the rotation cylinder 14 and its associated gear train, motor and controller. Translational and rotational positions are measured by feedback from position encoders (not shown) coupled to the associated gear trains. This feature permits mapping of the internal pipe surface (i.e., circularity) prior to initiation of the cutting process. This mapping permits manual adjustment of torch standoff if deemed necessary to optimize the cutting process. An additional benefit of this feature is that it allows reinstallation of the internal device at a particular position, if the device needs to be removed for maintenance.

The internal device 1 is preferably manufactured from steel and aluminum. The support bracket 16 interfaces with housing 15. Support bracket 16 and housing 15 are stationary components. The rotation cylinder 14 and axial ram 13 provide the rotational and translational movement, respectively, within housing 15.

Figure 4:
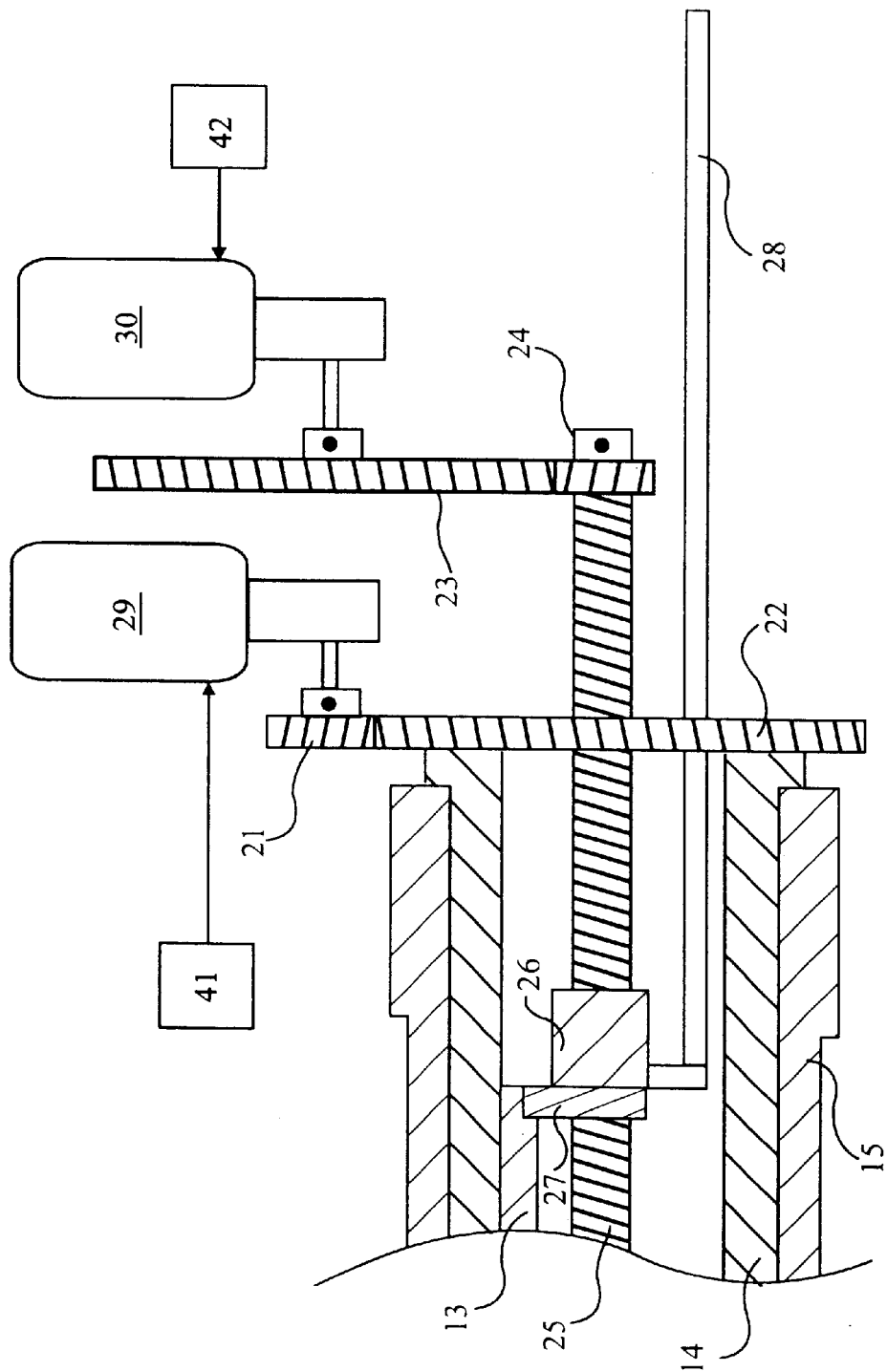
FIG. 4 is a drawing of a portion of the external device and drive mechanism.

Referring to FIG. 4, rotation cylinder 14 is actuated by a rotation mechanism comprising rotation drive gear 21 attached to a rotation motor 29 and a rotation driven gear 22 attached to the proximal end of cylinder 14. When the cylinder rotates, it causes ram 13 to rotate within the interior of the pipe to which the device is mounted. The translation of ram 13 into and out of the pipe is controlled by a translation mechanism comprising a ballscrew 25 and a nut 26 attached to the proximal end of ram 13 by a bracket 27. Ballscrew 25 is driven by ballscrew driven gear 24 and ballscrew drive gear 23 which is attached to a translation motor 30. The ram is fitted with a mechanical, linear position indicator 28 for indicating the approximate axial location of the cutter within the pipe. The precise axial positioning of the ram is indicated by a digital electronic device (not shown) which obtains input from, and which is calibrated to, the ballscrew drive gear 23. The translation mechanism positions the torch axially with an accuracy of ±0.010 inches. Another digital device (not shown) interfaces with the rotation drive gear 21 to display the precise rotational location. The ram is preferably square and hollow in cross-section. The hollow portion of the ram provides a pathway for torch service hoses and control cables. Rotation motor 29 and translation motor 30 are controlled by rotation and translation motor controllers 41 and 42, respectively. The motor controllers are not necessarily separate or independent and may comprise individual channels in a multichannel controller.

Figure 5:
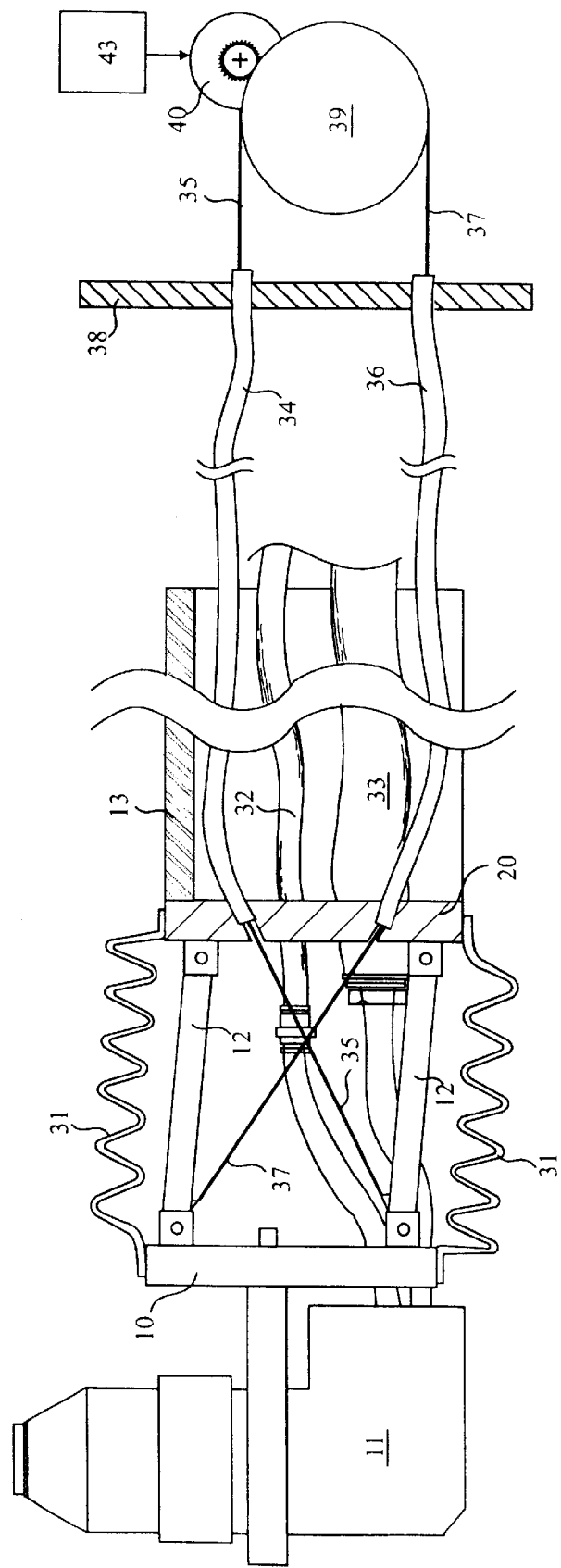
FIG. 5 is a drawing of a torch assembly, torch services and control cables.

Referring to FIG. 5, the radial movement of the torch 11 is permitted by a cutter arm assembly comprising pivot arms 12, torch mounting bracket 10 and end plate 20 in a four-bar linkage arrangement. End plate 20 is attached to the distal end of ram 13. The cutter arm assembly is actuated by a radial drive mechanism comprising mechanical control cables 35 and 37 and cable reel 39. The distal ends of cables 35 and 37 are connected or otherwise coupled to bracket 10. Cables 35 and 37 are enclosed in cable sheaths (housings) 34 and 36, respectively, whose distal ends are attached to plate 20. The control cables 35 and 37 are routed through the interior of the ram and wrapped around cable reel 39 which is mounted aft and separately from the internal device and the pipe to be cut. The proximal ends of sheaths 34 and 36 are attached to a cable plate 38 which is rigidly coupled to reel 39. Reel 39 is driven by a reel motor 40 coupled to a reel motor controller 43. The reel motor controller may be independent or may be one channel of a multichannel controller. The rotation of the reel determines the radial position of the torch. Hoses 32 and 33 provide services to torch 11. The cutter arm assembly, control cables and service hoses are protected from PAC blast effects by protective bellows 31.

Standoff (the distance between the torch tip and a pipe surface) must be controlled to maintain optimum ignition conditions for the plasma arc process. Commercially-available PAC power supply units are capable of measuring the voltage across the torch-to-pipe wall gap and providing a differential output voltage. This voltage across the torch-to-pipe gap varies with the size of the gap. The PAC power supply unit differential voltage output is coupled to reel motor controller 43 which drives reel motor 40. The device utilizes reel 39 and control cables 35 and 37 for adjusting the location of the torch relative to the pipe to maintain the optimum gap. The control cables are coupled to torch mounting bracket 10 whose movement is permitted by pivot arms 12.

The rate of torch assembly rotation and translation can be adjusted by a drive motor controller which determines the speed and direction of the rotation and translation motors. These motors can be operated independently or in cooperation to perform irregular cuts. Such motor controllers (including reel motor controllers), along with appropriate motors and encoders, can be obtained from various commercial motor and control system vendors or they can be custom designed for the application by those of ordinary skill in the control system art.

Although the axial ram is shown enclosed within the rotational cylinder, alternatively the cylinder could be enclosed in the ram and the arm assemblies attached to the cylinder. Also, where space permits, the radial movement of the cutter could be provided by other means such as a cam or crank on an axial shaft located within the ram or cylinder and connected to a radial drive motor. In these embodiments, rotational drive can be provided by sliding spline couplings.

A PAC torch has been described as the preferred cutter; however, another type of cutter could be used if appropriate for a particular application. For example, contact cutters such as mechanical saws or abrasive disks could be used. Also, other types of non-contact cutters such as abrasive water jets could be used where appropriate for the pipe material and thickness.

While the invention has been described above with respect to specific embodiments, it will be understood by those of ordinary skill in the art that various changes in form and details may be made therein without departing from the spirit and scope of the invention.

We claim:

1. An automated internal pipe-cutting device, capable of cutting longitudinally and circumferentially, comprising:
   a housing, for fitting into a pipe;
   a support bracket, attached to said housing, for attaching said housing to said pipe;
   a rotation cylinder, within said housing;
   an axial ram, within said cylinder;
   a cutter arm assembly, attached to said ram;
   a cutter, mounted on said arm assembly; and
   an automated drive mechanism connected to said cylinder, said ram and said cutter arm assembly,
   wherein said automated drive mechanism comprises:
   a rotation mechanism coupled to said cylinder,
   a translation mechanism coupled to said ram; and
   a radial drive mechanism coupled to said arm assembly.

2. A device as in claim 1 wherein said housing extends cantilever-fashion into said pipe such that said device does not contact any inside surface of said pipe.

3. A device as in claim 2 wherein said device is capable of cutting said pipe when said pipe is in any orientation.

4. A device as in claim 1 wherein said arm assembly provides for radial motion of said cutter with respect to an axis of said pipe.

5. A device as in claim 1 wherein said arm assembly comprises pivoting arms in a four-bar linkage arrangement.

6. A device as in claim 1 wherein said translation mechanism comprises a ballscrew and nut, said nut coupled to said ram.

7. A device as in claim 1 wherein said drive mechanism further comprises:
- a rotation motor coupled to said rotation mechanism;
- a translation motor coupled to said translation mechanism;
- a reel motor coupled to said radial drive mechanism;
- a rotation motor controller, coupled to said rotation motor;
- a translation motor controller, coupled to said translation motor; and
- a reel motor controller, coupled to said reel motor.

8. A device as in claim 7 wherein said radial drive mechanism further comprises:
- a cable reel coupled to said reel motor; and
- a cable connected to said cable reel and to said arm assembly.

9. A device as in claim 7 wherein said cutter is an adjustable cutter, adjustable to within ±0.010 inches of a desired axial position.

10. A device as in claim 7 wherein said rotation motor controller provides for rotational motion and said translation motor controller provides for translational motion of said cutter using adjustable feed rates.

11. A device as in claim 1 wherein said cutter comprises a plasma arc torch.

12. A device as in claim 11 wherein said torch assembly is assembled into a small, right-angled package shape.

13. A device as in claim 11 wherein said torch is able to cut a pipe having a wall thickness up to 4.5 inches.

14. A device as in claim 7 wherein said cutter comprises a plasma arc torch and said reel motor controller provides for automatic control of torch standoff.

15. A device as in claim 14 wherein said reel motor controller is responsive to a voltage provided by a power supply coupled to said torch.

16. A device as in claim 1 further comprising protective bellows surrounding said arm assembly.

17. A device as in claim 1 wherein said cutter is an abrasive water jet cutter.

18. A method for internally cutting a pipe, comprising the steps of:
- providing an internal pipe-cutting device as in claim 1;
- inserting the distal end of the housing into the open end of the pipe;
- attaching the housing to the pipe with the support bracket;
- translating the cutter by remote control to a desired position within the pipe;
- moving the cutter radially by remote control to a proper cutting radius;
- activating the cutter; and
- rotating the cutter by remote control around the inner circumference of the pipe.

* * * * *